United States Patent
Shih et al.

(10) Patent No.: US 12,176,739 B2
(45) Date of Patent: Dec. 24, 2024

(54) ELECTRONIC SYSTEM

(71) Applicant: ASUSTEK COMPUTER INC., Taipei (TW)

(72) Inventors: Chia Jui Shih, Taipei (TW); Kai-Chun Liang, Taipei (TW); Chia Yu Liu, Taipei (TW); Kian-Ming Chee, Taipei (TW); Yii-Lin Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 534 days.

(21) Appl. No.: 17/581,078

(22) Filed: Jan. 21, 2022

(65) Prior Publication Data

US 2022/0255328 A1 Aug. 11, 2022

(30) Foreign Application Priority Data

Feb. 9, 2021 (TW) .................................. 110104843

(51) Int. Cl.
*H02J 7/00* (2006.01)

(52) U.S. Cl.
CPC ......... *H02J 7/0024* (2013.01); *H02J 2207/20* (2020.01)

(58) Field of Classification Search
CPC .................................................... H02J 7/0024
USPC ....................................................... 320/116
See application file for complete search history.

(56) References Cited

U.S. PATENT DOCUMENTS

| 7,508,162 B2 * | 3/2009 | Lippojoki | ............... | H02J 7/342 |
| | | | | 320/103 |
| 2019/0074698 A1 * | 3/2019 | Singhal | .................... | H02J 7/342 |
| 2024/0222986 A1 * | 7/2024 | Gao | ...................... | H02J 7/0048 |

FOREIGN PATENT DOCUMENTS

| CN | 204046238 U | 12/2014 |
| CN | 107562167 A | 1/2018 |
| CN | 110739752 A | 1/2020 |
| TW | 201921826 A | 6/2019 |
| WO | WO-2022022272 A1 * | 2/2022 | ........ H01M 10/4285 |

* cited by examiner

*Primary Examiner* — Jerry D Robbins
(74) *Attorney, Agent, or Firm* — Muncy, Geissler, Olds & Lowe, P.C.

(57) ABSTRACT

An electronic system includes a first device and a second device is provided. The first device includes a power connector, a first connector, a first battery, and a charging controller. The second device includes a second connector and a second battery. The power connector is configured to receive an external voltage. The first battery is electrically connected to the power connector and the first connector. The charging controller is electrically connected to the power connector and the first battery. The second connector is utilized for connecting the first connector. The second battery is electrically connected to the second connector. When the first connector is connected to the second connector, the charging controller selectively connects the first battery and the second battery in a series via the first connector and the second connector according to the level of the first battery and the second battery.

17 Claims, 5 Drawing Sheets

ELECTRONIC SYSTEM

CROSS-REFERENCE TO RELATED APPLICATION

This application claims the priority benefit of Taiwan application serial No. 110104843, filed on Feb. 9, 2021. The entirety of the above-mentioned patent application is hereby incorporated by reference herein and made a part of the specification.

BACKGROUND OF THE INVENTION

Field of the Invention

The disclosure relates to an electronic system and, more particularly, to a charging electronic system.

Description of the Related Art

Mobile phones are usually used for playing games. Some classic computer games are reproduced on mobile phones. However, some problems, such as insufficient battery life and poor operation experience, arise when users play games on mobile phones. As a result, gaming phones are launched. The gaming phones have a larger battery capacity, auxiliary buttons, and accessories to improve the user experience.

However, the larger the battery capacity is, the longer the charging time is. Moreover, accessories and batteries often need to be charged separately, which is rather inconvenience.

BRIEF SUMMARY OF THE INVENTION

An electronic system is provided herein. The electronic system comprises a first device including and a second device. The first device includes a power connector, a first connector, a first battery, and a charging controller.

The power connector is configured to receive an external voltage. The first battery is electrically connected to the power connector and the first connector. The charging controller is electrically connected to the first connector and the first battery.

The second device includes a second connector and a second battery. The second connector is configured to be connected to the first connector. The second battery electrically is connected to the second connector.

When the first connector is electrically connected to the second connector, the charging controller selectively has the first battery and the second battery connected in series between a high voltage terminal of the power connector and a low voltage terminal of the power connector via the first connector and the second connector according to voltage levels of the first battery and the second battery to charge the first battery and the second battery simultaneously.

According the electronic system provides the function that the battery of the first device (such as a mobile phone) is connected in series with the battery of the second device (such as accessories). Then, the batteries can be directly charged via a high-power, and the charging time is reduced.

DETAILED DESCRIPTION OF THE EMBODIMENTS

These and other features, aspects and advantages of the present invention will become better understood with regard to the following description, appended claims, and accompanying drawings.

Figure 1:
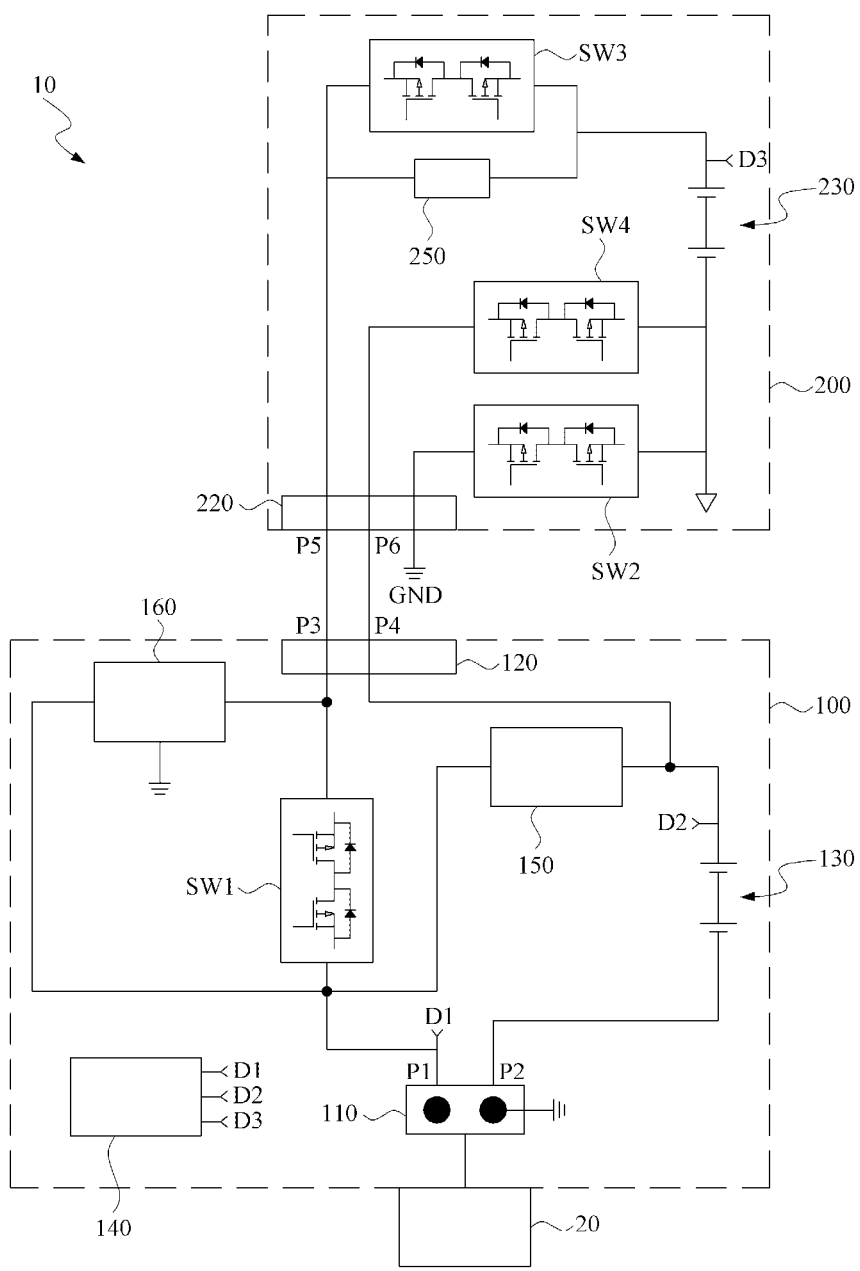
FIG. 1 is a schematic diagram showing circuits of an electronic system according to an embodiment.

FIG. 1 is a schematic diagram showing circuits of an electronic system according to an embodiment. An electronic system 10 includes a first device 100 and a second device 200.

The first device 100 includes a power connector 110, a first connector 120, a first battery 130, and a charging controller 140. A second device 200 includes a second connector 220 and a second battery 230.

The power connector 110 is configured to receive an external voltage. In an embodiment, the power connector 110 is electrically connected to an adaptor 20 to receive power. The first battery 130 is electrically connected to the power connector 110 and the first connector 120.

The second connector 220 is adapted to be connected to the first connector 120. The second battery 230 is electrically connected to the second connector 220. In an embodiment, the first connector 120 and the second connector 220 are Universal Serial Bus (USB) ports.

In an embodiment, the first connector 120 and the second connector 220 are ports of a same type, such as USB type-C ports, which is not limited herein. In an embodiment, the first connector 120 and the second connector 220 are different ports which can communicate and be electronically connected to each other, such as USB type-A ports and USB type-C ports.

The charging controller 140 is electrically connected to the power connector 110, the first connector 120, and the first battery 130. The charging controller 140 determines whether the adaptor is connected to the main power via the power connector 110. The charging controller 140 receives the detecting signals D1, D2 from the power connector 110 and the first battery 130, respectively, and receives a detecting signal D3 from the second battery 230 via the first connector 120 to confirm the voltage level, which is not limited herein.

In an embodiment, the charging controller 140 indirectly obtains the voltage level of the first battery or the second battery via other detecting units. In an embodiment, whether the power connector 110 is electronically connected to the adaptor 20 is determined according to whether the power is supplied to the charging controller 140.

When the power from the adaptor 20 is supplied to the charging controller 140, the charging controller 140 detects the voltage level of the first battery 130, and the charging controller 140 detects the voltage level of the second battery 230 via the first connector 120.

Then, the operation of internal components of the first device 100 and the second device 200 is controlled according to a preset control logic to control the charging mode. Various charging modes and charging control logics of the electronic system 10 are described hereinafter in detail accompanying FIG. 2 to FIG. 5 and Table 1.

As shown in figures, the electronic system 10 includes three selectable charging paths, a first charging path R1, a second charging path R2, and the third charging path R3.

The first charging path R1 is from a high voltage terminal P1 of the power connector 110, through the first battery 130, to a low voltage terminal P2 of the power connector 110. The first battery 130 is charged via the power connector 110 through the first charging path R1.

In an embodiment, the first device 100 further includes a first charging unit 150 on the first charging path R1. The first charging unit 150 is used to convert the electric energy from the power connector 110 to an appropriate voltage to charge the first battery 130. In an embodiment, the first charging unit 150 is a buck converter, which is not limited herein. In an embodiment, the first charging unit 150 is a charge pump charger, a flyback converter, or charging circuits or chips of other types.

The first connector 120 includes a first high voltage terminal P3 and a first low voltage terminal P4. The second connector 220 includes a second high voltage terminal P5 and a second low voltage terminal P6.

The second charging path R2 is from the high voltage terminal P1 of the power connector 110, passes through the first high voltage terminal P3 of the first connector 120, the second high voltage terminal P5 of the second connector 220, the second battery 230, and then to a ground GND of the second device 200 in sequence.

The power connector 110 charges the second battery 230 via the first connector 120 and the second connector 220 through the second charging path R2.

In an embodiment, the second device 200 further includes a second charging unit 250 on the second charging path R2. The second charging unit 250 is used to convert the electric energy from the second connector 220 to an appropriate voltage to charge the second battery 230.

In an embodiment, the second charging unit 250 is a buck converter, which is not limited herein. In an embodiment, the second charging unit 250 is a charge pump charger, a flyback converter, or charging circuits or chips of other types.

In an embodiment, the first device 100 further includes a first switch SW1 on the second charging path R2 to selectively conduct the circuit between the high voltage terminal P1 of the power connector 110 and the first high voltage terminal P3 of the first connector 120.

In an embodiment, the second device 200 further includes a second switch SW2 disposed on the second charging path R2 to selectively conduct the circuit between a negative electrode of the second battery 230 and the ground GND of the second connector 220.

The third charging path R3 is from the high voltage terminal P1 of the power connector 110, passes through the first high voltage terminal P3 of the first connector 120, the second high voltage terminal P5 of the second connector 220, the second battery 230, the second low voltage terminal P6 of the second connector 220, the first low voltage terminal P4 of the first connector 120 and the first battery 130, and then to the low voltage terminal P2 of the power connector 110.

The power connector 110 charges the first battery 130 and the second battery 230 via the first connector 120 and the second connector 220 through the third charging path R3.

The first battery 130 is connected to the second battery 230 in series via the first connector 120 and the second connector 220.

In an embodiment, the first device 100 further includes a third charging unit 160 on the third charging path R3. The third charging unit 160 ensures a sufficient charging voltage in charging on the third charging path. In an embodiment, the third charging unit 160 is a charge pump charger to improve a conversion efficiency in charging.

In an embodiment, the second device 200 further includes a third switch SW3 on the third charging path R3 to selectively conduct the circuit between the second high voltage terminal P5 of the second connector 220 and the second battery 230. In an embodiment, the second device 200 further includes a fourth switch SW4 on the third charging path R3 to selectively conduct the circuit between the second battery 230 and the second low voltage terminal P6 of the second connector 220.

According to the selection of the charging paths, the electronic system 10 provides four charging modes, that is, a series charging mode, a parallel charging mode, the first battery 130 is charged alone, and the second battery 230 is charged charging alone. The four charging modes are described below.

Figure 2:
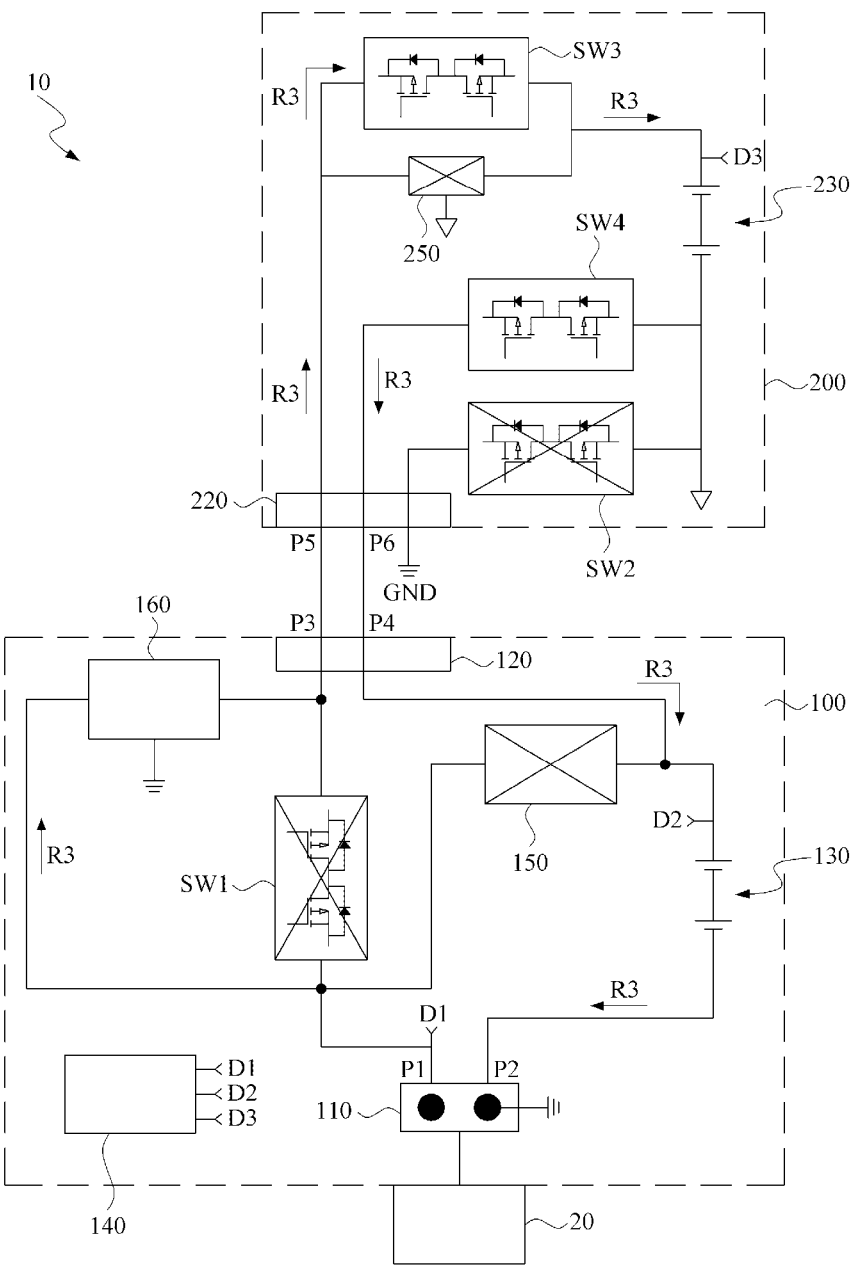
FIG. 2 is a schematic diagram showing circuits of an electronic system in FIG. 1 in a series charging mode according to an embodiment.

Please refer to FIG. 1 and FIG. 2. FIG. 2 is a schematic diagram showing circuits of an electronic system in FIG. 1 connected in series according to an embodiment. In the embodiment, the charging is through the third charging path R3.

In detail, in the series charging mode, the first switch SW1 and the second switch SW2 are cut off, and the third switch SW3 and the fourth switch SW4 are conducted. Moreover, the first charging unit 150 and the second charging unit 250 are disabled, and the third charging unit 160 is enabled.

Figure 3:
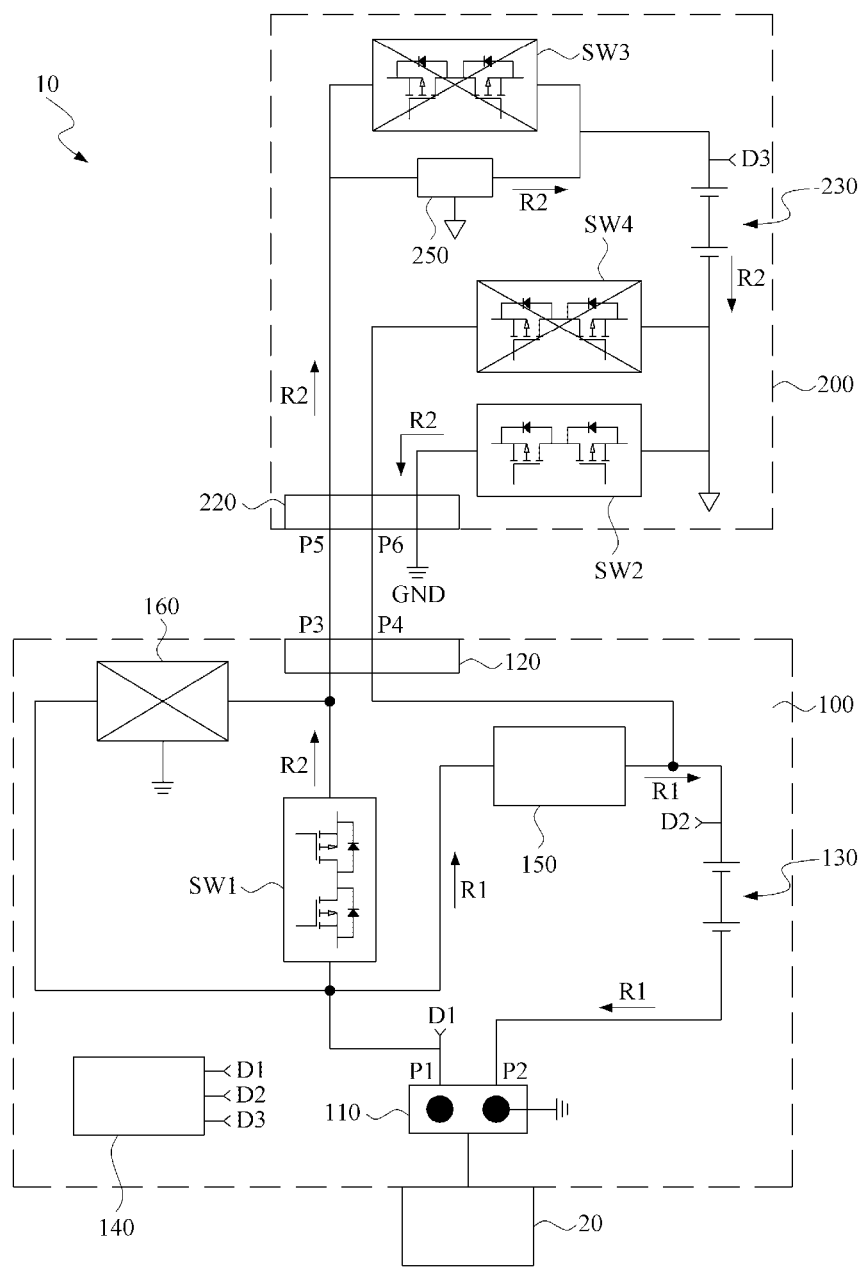
FIG. 3 is a schematic diagram showing circuits of an electronic system in FIG. 1 in a parallel charging mode according to an embodiment.

Please refer to FIG. 3. FIG. 3 is a schematic diagram showing circuits of the electronic system 10 in FIG. 1 in a parallel charging mode according to an embodiment. In the embodiment, the first charging path R1 and the second charging path R2 are connected in a parallel in charging.

In detail, in the parallel charging mode, the first switch SW1 and the second switch SW2 are conducted, and the third switch SW3 and the fourth switch SW4 are cut off. The first charging unit 150 and the second charging unit 250 are enabled, and the third charging unit 160 is disabled.

Figure 4:
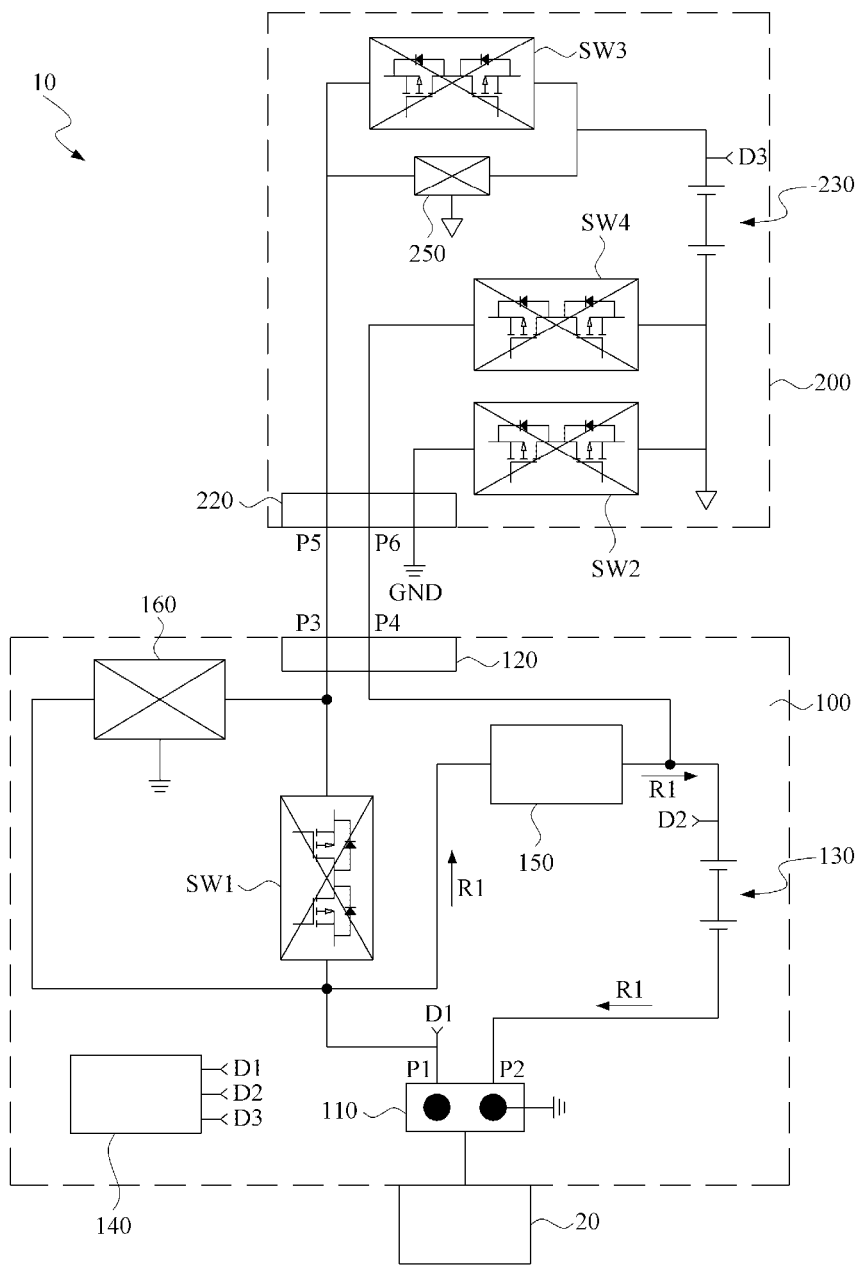
FIG. 4 is a schematic diagram showing the electronic system in FIG. 1 charges a first battery according to an embodiment.

Please refer to FIG. 1 and FIG. 4. FIG. 4 is a schematic diagram showing the electronic system 10 in FIG. 1 charges the first battery 130 according to an embodiment. In the embodiment, the first battery 130 is charged via the first charging path R1.

In detail, when the first battery 130 is charged, the first switch SW1, the second switch SW2, the third switch SW3, and the fourth switch SW4 are cut off. In addition, the second charging unit 250 and the third charging unit 160 are disabled. The first charging unit 150 is enabled to charge the first battery 130.

Figure 5:
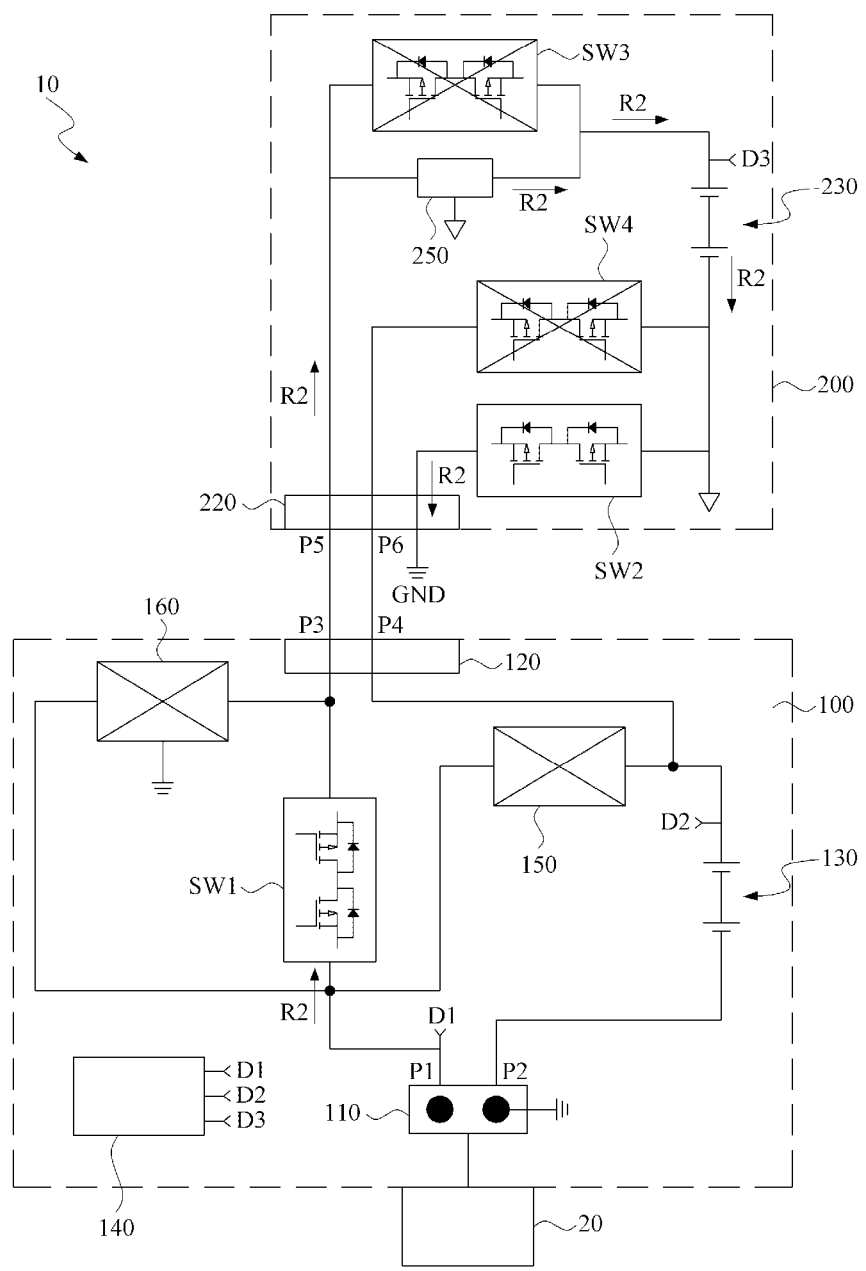
FIG. 5 is a schematic diagram showing the electronic system in FIG. 1 charges a second battery according to an embodiment.

Please also refer to FIG. 5. FIG. 5 is a schematic diagram showing the electronic system 10 in FIG. 1 charges the second battery 230 according to an embodiment. In the embodiment, the second battery 230 is charged via the second charging path R2.

In detail, when the second battery 230 is charged, the first switch SW1 and the second switch SW2 are conducted, and the third switch SW3 and the fourth switch SW4 are cut off. In addition, the first charging unit 150 and the third charging unit 160 are disabled, and the second charging unit 250 charges the second battery 230.

In an embodiment, the charging mode of the electronic system 10 is determined according the voltage level of the first battery 130 and the second battery 230. The charging control logic is shown in Table 1.

In detail, when the first connector 120 of the first device 100 is electrically connected to the second connector 220 of the second device 200 and the power connector 110 of the first device 100 is connected to an external power supply, the charging controller 140 controls the operation of components of the first device 100 and the second device 200 according to the charging control logic at the table 1.

In embodiments, the aforementioned electrical connection is directly plug, wired or wireless connection, which is not limited herein.

TABLE 1

| | | second device | |
|---|---|---|---|
| first device | V1 < 4 V | 4 V < V1 ≤ 4.32 V | V1 ≥ 4.32 V |
| V2 < 4 V | battery connected in series | battery connected in parallel | only charge a second battery |
| 4 V < V2 ≤ 4.32 V | battery connected in parallel | battery connected in parallel | only charge a second battery |
| V2 ≥ 4.32 V | only charge a first battery | only charge a first battery | stop charging |

As shown in the table 1, when the voltage level V1 of the first battery 130 is smaller than the first preset voltage (4V in the table 1), and the voltage level V2 of the second battery 230 is smaller than a second preset voltage (4V in the table 1), the first device 100 and the second device 200 are charged at the series charging mode as shown in FIG. 2.

That is, the charging controller 140 controls that the first battery 130 and the second battery 230 are charged and connected in series between the high voltage terminal P1 and the low voltage terminal P2 of the power connector 110 via the first connector 120 and the second connector 220. As a result, the charging time is reduced via high power and high current.

The level of the first preset voltage and the second preset voltage depend on the saturation voltage of the first battery 130 and the second battery 230. In an embodiment, the first battery 130 and the second battery 230 include the same saturation voltage, and the first preset voltage and the second preset voltage are the same accordingly. The charging modes are switched according to the first preset voltage and the second preset voltage. Then, the overheating of the batteries due to high charging current or the damage of the batteries due to overcharging are avoided.

Please refer to the Table 1, when the voltage level V1 of the first battery 130 is higher than the first preset voltage (4V in the table 1), or the voltage level V2 of the second battery 230 is higher than the second preset voltage (4V in the table 1), the charging controller 140 controls the first device 100 and the second device 200 to switch to the parallel charging mode in FIG. 3 to shunt current. Then, the current value for charging the first battery 130 and the second battery 230 is reduced, and the overheating of the batteries due to high charging current or the damage of the batteries due to overcharging are avoided.

Please refer to the table 1, when the voltage level V2 of the second battery 230 is higher than or equals to the preset saturation voltage (4.32 V in the Table 1) of the second battery 230, the second battery 230 is fully charged. At the time, the charging controller 140 controls the first device 100 and the second device 200 to the charging mode in FIG. 4, that is, the charging to the second battery 230 is stopped, and the first battery 130 is charged alone.

Please refer to the Table 1, when the voltage level V1 of the first battery 130 is higher than or equals to the preset saturation voltage (4.32 V in the table 1) of the first battery 130, the first battery 130 is fully charged. At the time, the charging controller 140 controls the first device 100 and the second device 200 to switch to the charging mode in FIG. 5. That is, the charging to the first battery 130 is stopped, and the second battery 230 is charged alone.

When the voltage level V1 of the first battery 130 is higher than or equals to the preset saturation voltage (4.32 V in the table 1) of the first battery 130, and the voltage level V2 of the second battery 230 is higher than or equals to the preset saturation voltage (4.32 V in the Table 1) of the second battery 230, the first battery 130 and the second battery 230 are fully charged. The charging controller 140 stops the first charging unit 150 and the second charging unit 250 to stop the charging to the first battery 130 and the second battery 230.

The electronic system 10 provides the function that the battery of the first device 100 (such as a mobile phone) is connected in series with the battery of the second device 200 (such as an accessory) and charged. Then, the battery is directly charged via high-power, and the charging time is reduced.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An electronic system, comprising:
a first device, including:
a power connector, configured to receive an external voltage;
a first connector;
a first battery, electrically connected to the power connector and the first connector; and
a charging controller, electrically connected to the first connector and the first battery; and
a second device, including:
a second connector, configured to be connected to the first connector; and
a second battery, electrically connected to the second connector;
wherein when the first connector is electrically connected to the second connector, the charging controller selectively has the first battery and the second battery connected in series between a high voltage terminal of the power connector and a low voltage terminal of the power connector via the first connector and the second connector according to voltage levels of the first battery and the second battery to charge the first battery and the second battery simultaneously.

2. The electronic system according to claim 1, wherein the power connector charges the first battery via a first charging path, and the first charging path is from the high voltage terminal of the power connector, through the first battery, to the low voltage terminal of the power connector.

3. The electronic system according to claim 2, wherein the first device further includes a first charging unit configured on the first charging path.

4. The electronic system according to claim 3, wherein the first charging unit is a buck converter.

5. The electronic system according to claim 1, wherein the first connector includes a first high voltage terminal and a the first low voltage terminal, the second connector includes a second high voltage terminal and a second low voltage terminal, the power connector charges the second battery via the first connector and the second connector through a second charging path, and the second charging path is from the high voltage terminal of the power connector, though the first high voltage terminal, the second high voltage terminal, and the second battery in sequence to a ground.

6. The electronic system according to claim 5, wherein the second device further includes a second charging unit configured on the second charging path.

7. The electronic system according to claim 6, wherein the second charging unit is a buck converter.

8. The electronic system according to claim 5, wherein the first device further includes a first switch configured on the second charging path to selectively conduct a circuit between the high voltage terminal of the power connector and the first high voltage terminal.

9. The electronic system according to claim 5, wherein the second device further includes a second switch configured on the second charging path to selectively conduct a circuit between a negative electrode of the second battery and the ground.

10. The electronic system according to claim 1, wherein the power connector charges the first battery and the second battery simultaneously via the first connector and the second connector through a third charging path, and the first battery is connected in series with the second battery via the first connector and the second connector.

11. The electronic system according to claim 10, wherein the first connector includes a first high voltage terminal and a first low voltage terminal, the second connector includes a second high voltage terminal and a second low voltage terminal, the third charging path is from the high voltage terminal of the power connector, through the first high voltage terminal, the second high voltage terminal, the second battery, the second low voltage terminal, the first low voltage terminal and the first battery in sequence, to the low voltage terminal of the power connector.

12. The electronic system according to claim 11, wherein the first device further includes a third charging unit configured on the third charging path.

13. The electronic system according to claim 12, wherein the third charging unit in a charge pump charger.

14. The electronic system according to claim 11, wherein the second device further includes a third switch configured on the third charging path to selectively conduct a circuit between the second high voltage terminal and the second battery.

15. The electronic system according to claim 11, wherein the second device further includes a fourth switch configured on the third charging path to selectively conduct a circuit between the second battery and the second low voltage terminal.

16. The electronic system according to claim 1, wherein the voltage level of the first battery is smaller than a first preset voltage, and the voltage level of the second battery is smaller than a second preset voltage, the charging controller has the first battery and the second battery connected in series between the high voltage terminal and the low voltage terminal of the power connector via the first connector and the second connector to charge the first battery and the second battery simultaneously.

17. The electronic system according to claim 1, wherein the first connector and the second connector are Universal Serial Bus (USB) ports.

* * * * *